R. MOSKOWITZ.
EXPANDED TIRE.
APPLICATION FILED NOV. 12, 1915.

1,217,486.

Patented Feb. 27, 1917.
2 SHEETS—SHEET 1.

WITNESSES:
Fred. Roeger,
Richard Wegner.

INVENTOR
Rudolph Moskowitz.
BY
Hans C. Boos
ATTORNEY

R. MOSKOWITZ.
EXPANDED TIRE.
APPLICATION FILED NOV. 12, 1915.
1,217,486.
Patented Feb. 27, 1917.
2 SHEETS—SHEET 2.
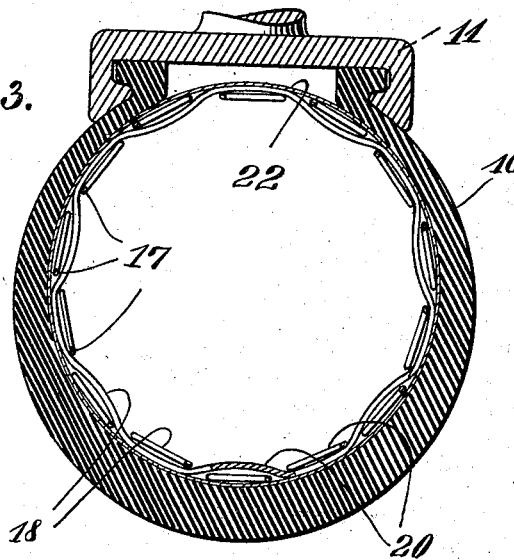
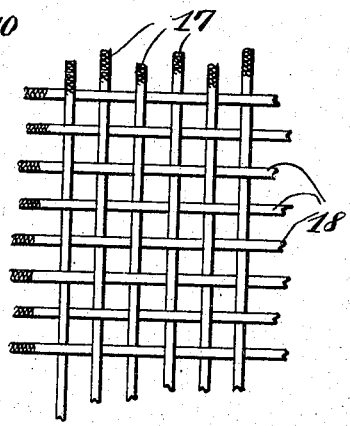
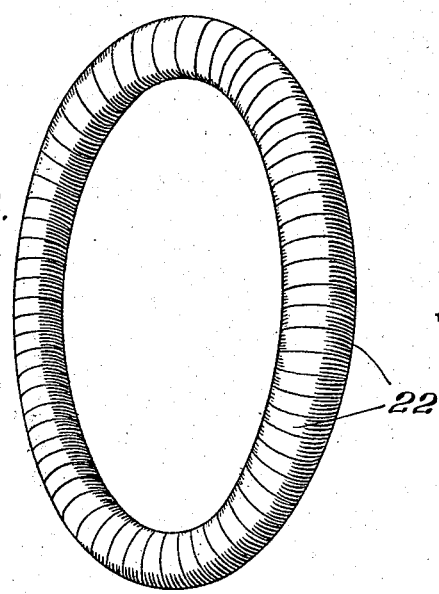
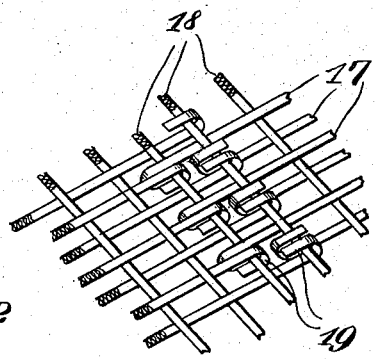
WITNESSES:
Fred. Roeger,
Richard Wegener.
INVENTOR
Rudolph Moskowitz.
BY
Hans C. Boos
ATTORNEY

UNITED STATES PATENT OFFICE.

RUDOLPH MOSKOWITZ, OF NEW YORK, N. Y., ASSIGNOR OF ONE-HALF TO JONAS GEWIRTZ, OF NEW YORK, N. Y.

EXPANDED TIRE.

1,217,486.  Specification of Letters Patent.  Patented Feb. 27, 1917.

Application filed November 12, 1915. Serial No. 61,065.

*To all whom it may concern:*

Be it known that I, RUDOLPH MOSKOWITZ, a citizen of the United States, and a resident of New York, in the county of New York and State of New York, have invented certain new and useful Improvements in Expanded Tires, of which the following is a specification.

This invention relates to improvements in resilient tires for vehicles, and particularly to types adapted to be used as substitutes for inner pneumatic or inflatable tubes.

The principal object of the invention is to provide a substitute for such inner tubes, possessing the flexibility, resilience and elasticity of such tubes, in addition avoiding damage to the tires by reason of punctures, blow-outs and the like to which such pneumatic tires are susceptible, and furthermore dispensing with the inconvenience and labor necessitated by inflating the same.

Another object is in the provision of a substitute of light weight, and adequate strength, easily applied and which has no deleterious effect upon the tire carcass.

These and other analogous objects are attained by the novel construction and arrangement of parts, hereafter described and shown in the accompanying drawings, forming a material part of this specification and in which:—

Fig. 3 is an enlarged cross sectional view taken through the tire.

Fig. 4 is a perspective view of the expanding device in its wrapper, ready for insertion.

Fig. 5 is a diagrammatic view, showing the expanding device extended flat, the wires being interwoven but shown exaggeratedly separated so that the view may be clear.

Fig. 6 is a perspective view similar to Fig. 5 but showing the connections at its adjoining ends, and Fig. 7 is a fragmental view of the wire strands in their bent condition prior to weaving.

Figure 1:
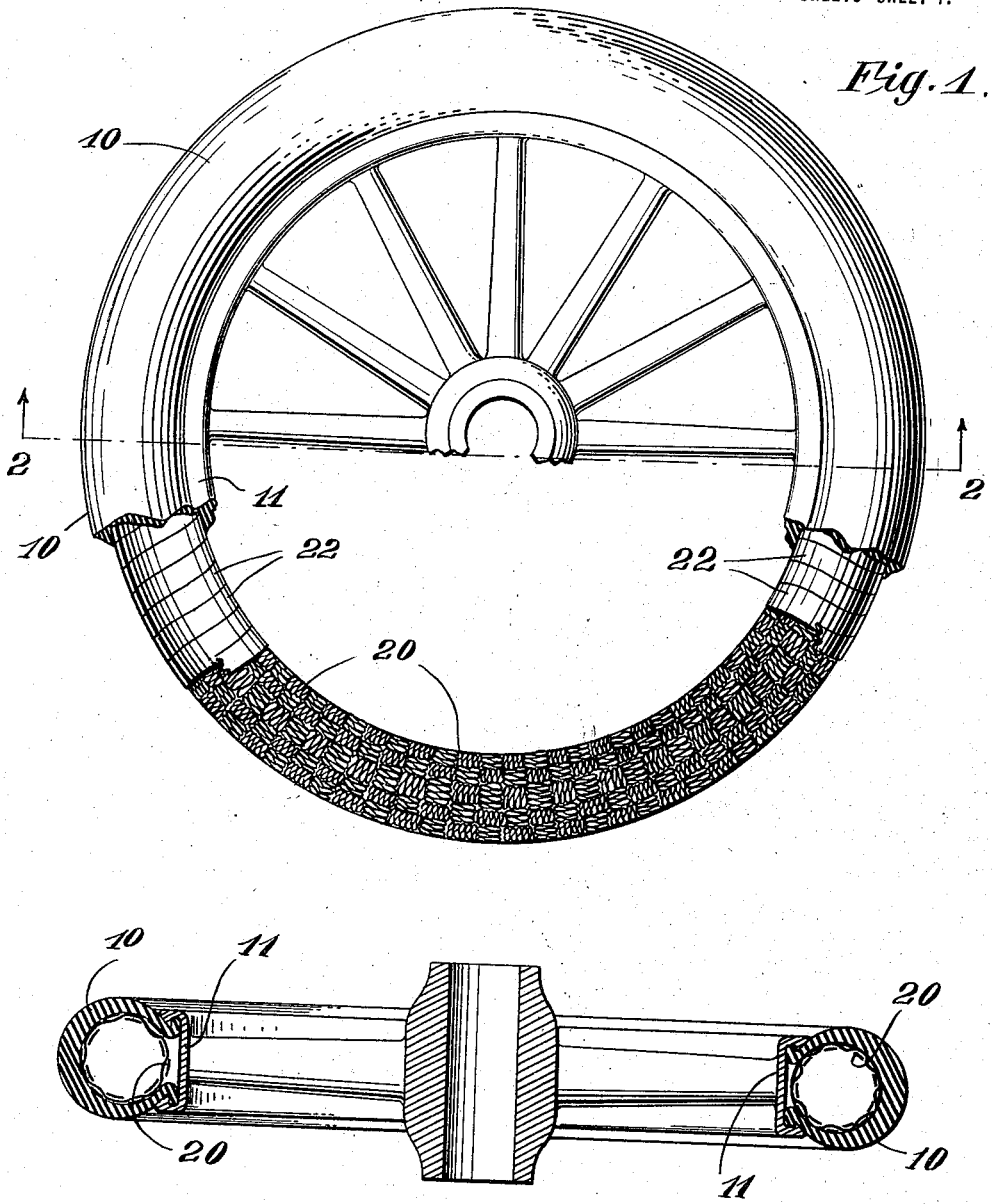
Figure 1 is a side elevation of a wheel of conventional form, parts being broken away to show the interior of the tire, containing the expanding device constituting the invention.
Figure 2:
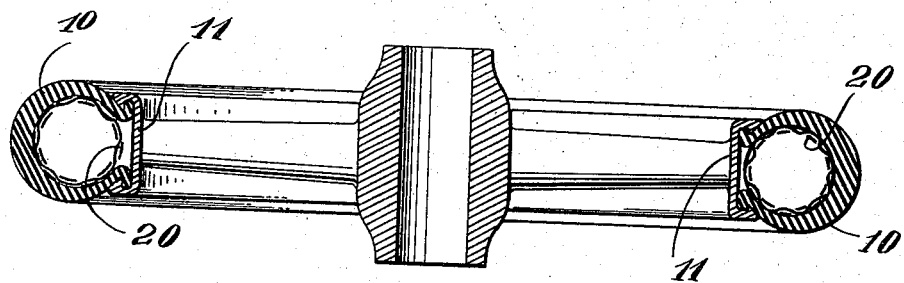
Fig. 2 is a horizontal sectional view, taken on line 2—2 of Fig. 1.

In the drawings the numeral 10 designates the carcass or body of the tire which is held in the channeled rim 11, both being in all respects of the usual construction.

In the formation of the expanding element wires are bent to form oppositely disposed loops 15, their straight sides 16 being disposed at a slight angle to each other, as shown clearly in Fig. 7.

These wires, in their bent condition, are interwoven, as in Fig. 5, forming a strong yet flexible fabric, certain of the wires, as 17, being of such length as to extend entirely around the inner circumference of the tire and their ends turned to form hooks 19, alternate strands being engaged with the cross wire 18 which is substantially continuously coiled spirally to form a bent tube 20 suited to the interior of the tire.

When this wire tube has been formed into its proper final shape it is wound with a narrow strip or band of textile fabric 22, as strong canvas, the strip being disposed spirally, each convolution slightly overlying that immediately preceding so that no part of the wires are exposed.

The tube thus covered is then placed in position in the tire body and mounted on the wheel in the usual manner.

From the foregoing it will be seen that the usual inflatable tire is dispensed with and it will be apparent that the substitute presented avoids many of the inherent defects of such tubes and has certain advantages, such as immunity from injury by punctures and the like, the necessity for valves, recharging with air or damages arising from increase in temperature.

The lasting qualities are far in excess of any vegetable product, as gum caoutchouc, while the effects produced are in every way as satisfactory.

Having thus described my invention what

I claim as new and desire to secure by Letters Patent, is:—

In a tire the combination, with a body portion and a support therefor, of a plurality of wires bent to form resilient, looped, flat strands, said strands being interwoven and formed into an endless tube, and a covering for said tube.

In testimony whereof I have signed my name to this specification.

RUDOLPH MOSKOWITZ.

Copies of this patent may be obtained for five cents each, by addressing the "Commissioner of Patents, Washington, D. C."